Figure 1:
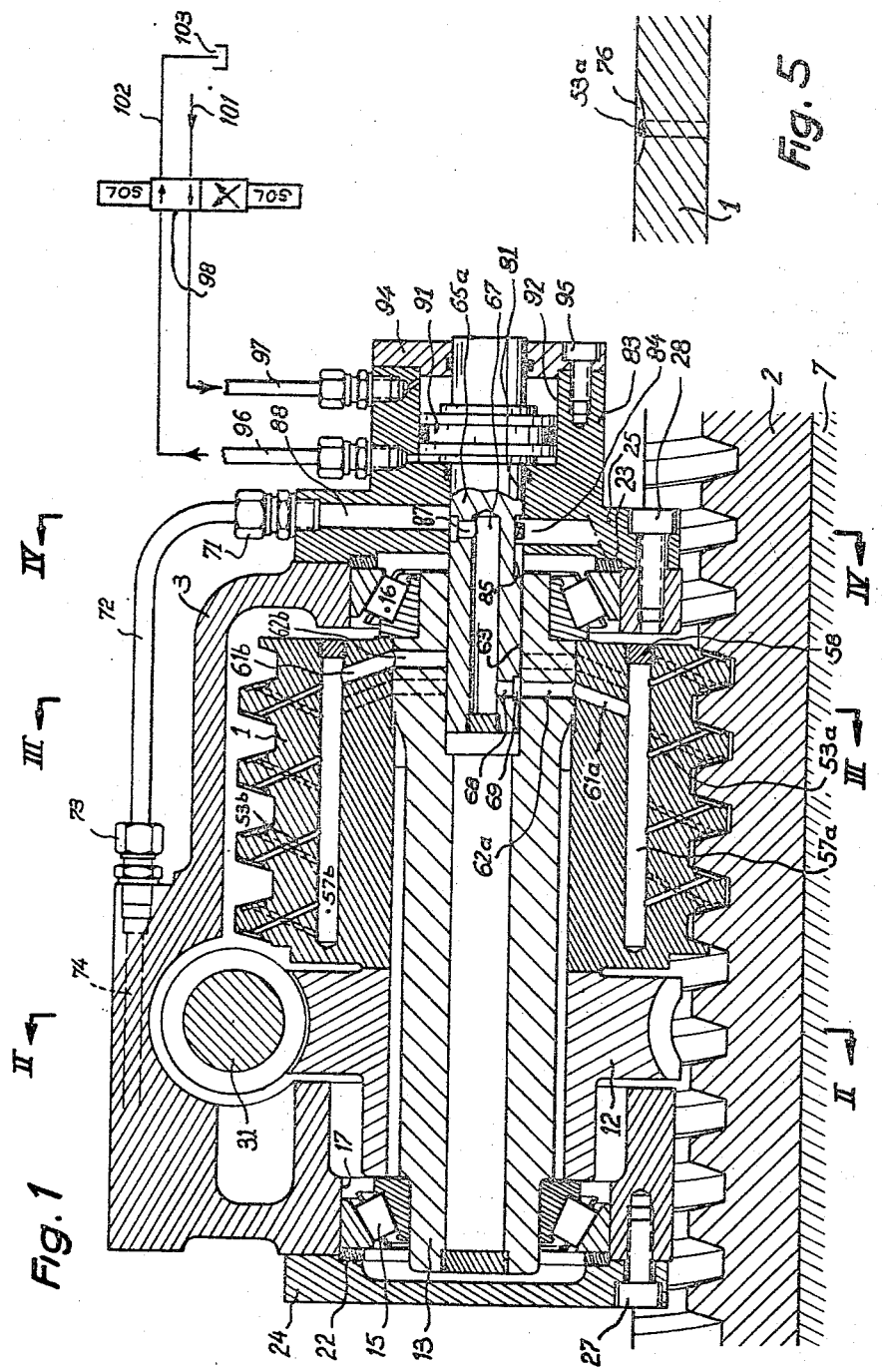

July 18, 1967  R. DEFLANDRE  3,331,469
ARRANGEMENTS FOR LUBRICATING NUT AND SCREW DEVICES
Filed May 4, 1965  3 Sheets-Sheet 1

United States Patent Office 3,331,469
Patented July 18, 1967

3,331,469
ARRANGEMENTS FOR LUBRICATING NUT
AND SCREW DEVICES
René Deflandre, Paris, France, assignor to Societe dite:
Derefa, Etablissement pour la Developpement, Recherches et Fabrications Industrielles, Vaduz, Liechtenstein
Filed May 4, 1965, Ser. No. 453,135
Claims priority, application France, May 6, 1964,
973,470; Jan. 22, 1965, 2,862
7 Claims. (Cl. 184—6)

The present invention relates to arrangements for lubricating under presure the threads of screw and nut devices particularly of the threaded rack type, used in controlling the advance or lead movements of machine parts, in which the screw thread flanks are supplied with oil under pressure by means of internal distributing conduits formed in the screw, one end of which opens onto said thread flanks, whilst the other end is connected to a suitable source of oil pressure by means of a distributor arranged so that at any moment, only those conduits which open onto parts of the thread flanks in contact with corresponding parts of the thread of the toothed rack, are connected to said source.

In devices of this type, oil is thus introduced, at a certain pressure, to the two screws at that part thereof mutually in engagement, which permits the formation of the film of oil directly at the location where the relative translation force of the two machine parts is exerted, in which the worm or screw and the toothed rack are respectively mounted. When the speed of rotation of the worm or screw reaches a certain value, the film of oil is thus formed in a certain manner.

However, it is also necessary to consider the cases of average speeds and especially of very low speeds for which the film of oil cannot be formed by displacement of the surfaces in contact. Under these conditions, it would be useless to increase the oil pressure on the two thread flanks because the forces resulting from this pressure would be opposed and consequently would have no effect with regard to the axial translation force which is exerted only on a single thread flank. This force would not be balanced by a reacting cushion of oil, and then everything would occur as in the case of a lubrication by oil.

It is an object of the invention to remedy or mitigate this disadvantage by improving the arrangement so as to ensure a hydrostatic lubrication of only those thread flanks which are instantaneously supporting the reaction of the translation force, whatever may be the direction of rotation of the worm or screw.

Accordingly, the invention consists in an arrangement for lubricating under pressure the threads of screw and nut devices of the threaded rack type used for controlling the lead or advance movements of machine tool parts, the screw thread flanks being supplied with oil under pressure by means of internal distributing conduits formed in the screw and one end of which opens out on said thread flanks, whilst their other end is connected to a suitable source of oil under pressure, by means of a distributor arranged in such a way that at each moment only the conduits which open out on parts of screw thread flanks in contact with the corresponding thread flanks of the toothed rack are connected to said source, wherein said conduits for supplying the screw thread flanks with oil under pressure are divided up into a first group of conduits which open onto one of the flanks of the threads and a second group of conduits which open onto the other flank of said threads, the connection between said two groups of conduits and the source of oil incorporating a throw-over switch having two positions which enable that one of the two groups of conduits supplying the thread flanks transmitting the force dependant upon the direction of rotation of the screw to be selectively supplied with oil.

Advantageously, the distributor for oil under pressure to the single conduits terminating at those parts of the thread flanks in contact with corresponding parts of thread flanks of the toothed rack, is arranged so as also to act as the above mentioned two-position throw-over switch.

Thus, in one particular embodiment, the distributor comprises a member fixed in rotation and having an input conduit, one end of which is connected to the source of oil under pressure and the other end of which is applied to a cylindrical surface of the rotatable worm or screw, onto which the first group and the second group of conduits for supplying the thread flanks with oil under pressure respectively open, at regularly and angularly spaced intervals in two distinct transverse planes, and, moreover, the distributor is axially movable and is provided with control means which are suitable for it to occupy, selectively, the axial position for which it puts the oil source in communication with one or the other of the two above mentioned groups of supply conduits.

According to another feature of the invention, the control means for the distributor and throw-over switch are constituted by a hydraulic jack, the piston of which is formed by an extension of the body of said distributor and switch.

It is important that this jack be controlled by an electro-valve, i.e. an electrically-operated valve, actuated simultaneously with a system of electrical pre-selection of the direction of rotation of the worm or screw. In fact, the guiding of the throw-over switch to one or the other of its two possible positions, is effected at the moment when the direction of the displacement of the machine tool part controlled by the screw and toothed rack system, is selected, i.e. before the mechanism is switched on. In this way, the pressure is already established, between the thread flanks in engagement when the mechanism is switched on.

The lubricating pressure is selected to be at a value which is suitable for the average pressure which is established on the whole of the surface of the threads in engagement to correspond to the translation force of the machine part or member to be displaced. This pressure is regulated by any suitable conventional means, for example, by a valve arranged in the return circuit of a pump for supplying the lubricating oil. Moreover, the thread flanks opposite those which take up the force continue to receive oil at a low pressure due to the leakages of the distributor.

Figure 2:
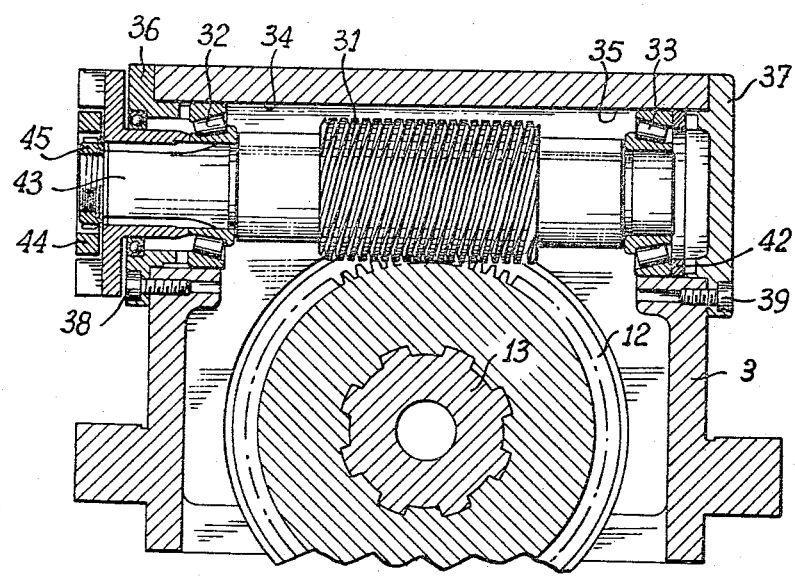
Figure 3:
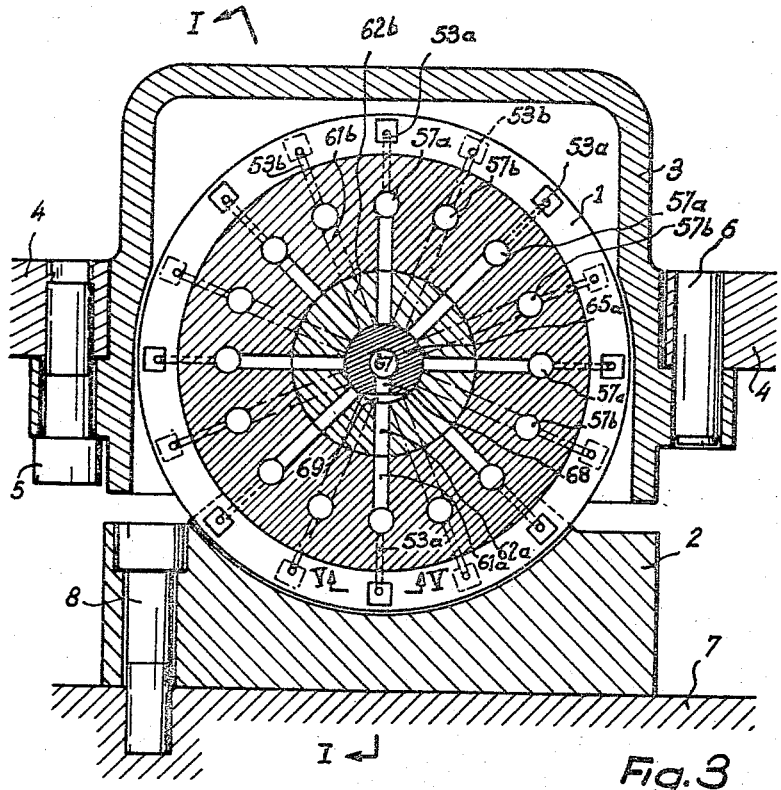
Figure 4:
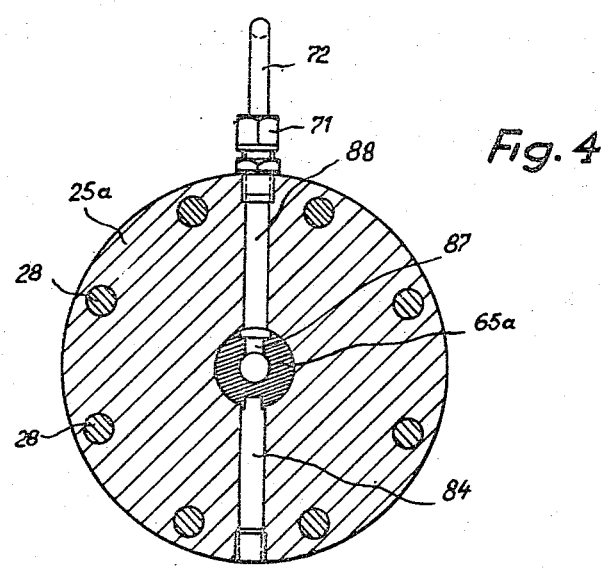

In order that the invention may be more clearly understood, reference will now be made to the accompanying drawings which show, by way of example, one embodiment of an arrangement according to the invention for lubricating a screw and threaded toothed rack device for controlling advance movements, and in which:

FIGURE 1 shows an axial section through the arrangement and taken along the line I—I of FIGURE 3, FIGURES 2, 3, and 4 show sections through the arrangement taken respectively along the lines II—II, III—III, and IV—IV of FIGURE 1, and FIGURE 5 shows a part section taken along the line V—V of FIGURE 3.

The device for controlling advance movements, shown in the drawings, comprises a worm screw 1 (FIGURES 1 and 3) engaged with a threaded rack or lead screw 2, the worm 1 being mounted in a casing 3 rendered integral with one member 4 of a machine tool 4, by means of screws such as 5, and studs or positioning feet such as 6, whilst the threaded rack or lead screw 2, is secured to another member 7 of the machine tool, by means of screws such as 8 and positioning elements, such as pins or centring feet (not shown).

The device is intended to ensure relative displacements of the member 4, with respect to the member 7, along slides (not shown whose direction is parallel to the axis of the screw 1.

The worm 1 is carried, together with a hollow, toothed pinion 12, by a channelled shaft 13, the two ends of which are respectively supported by the internal rings of two tapered roller bearings 15, 16, the external rings of which are mounted in two co-axial bores 17, 18, formed in two opposite faces of the casing 3. The axial positioning of the two roller bearings is ensured through two annular keys 22, 23 of suitable thickness, by two covers 24, 25, respectively secured to the two above mentioned walls of the casing 3, by means of screws 27, 28 respectively.

The hollow pinion 12 is rotated by a worm screw 31 (see also FIGURE 2), supported at its two ends, by means of two rollers bearings 32, 33 respectively, the external rings of which are located in two co-axial bores 34, 35 made in two other walls of the casing 3. The axial positioning of the two roller bearings 32, 33 is ensured by two covers 36, 37 fixed to the casing by means of screws 38, 39. A key 42, of adjustable thickness, is inserted between one of the two bearings, for example the bearing 33, and the corresponding holding cover 37.

On one channelled end 43 of the worm screw 31, is mounted a coupling member 44, the bore of which has corresponding channels and which is fixed on said shaft by means of a self-locking nut 45. The coupling member 44 is intended to be engaged with a conjugated coupling member connected to any suitable source of rotation.

The device comprises a system of lubricating those parts of the thread flanks of the worm 1 in contact with the corresponding thread flanks of the toothed rack 2. The lubricating arrangement comprises conduits 53a for distributing oil under pressure (FIGURES 1 and 3), which open onto one of the flanks (which, for reasons of convenience, will be designated by "right-hand" sides considering FIGURE 5) of the threads of the worm 1.

These distributing conduits 53a are situated in radial planes, eight in number in the embodiment shown and together making equal dihedral angles. For convenience in machining, these conduits are bored in an oblique direction. All the conduits 53a, which are located in the same radical plane, open, at their other end, into a distributing conduit 57a in the body of the worm screw 1, and formed in a direction parallel to the axis of the latter. The end by which each of the conduits 57a has been bored, is obturated by a threaded plug 58.

Similarly, conduits 53b for distributing oil under pressure open onto each of the "left-hand" thread flanks of the screw, said conduits also being situated in radial planes, eight in number in the embodiment shown, and positioned between the radial planes which enclose the distributing conduits 53a. All the conduits 53b of a same radial plane, open out into a distributing conduit 57b similar to the distributing conduit 57a described above. In the embodiment, the arrangement thus comprises eight distributing conduits 57a and eight distributing conduits 57b regularly spaced on a cylindrical surface which is theoretically or substantially co-axial with the screw.

A radial conduit 61a formed in the body of the worm screw 1 opens out into each distributing conduit 57a, in an oblique direction in order to enable the passage of the drill through the corresponding end of the bore of the body of the worm screw by means of which the latter is mounted on the channelled shaft 13. Each conduit 61a is, for its part, in communication with a radial conduit 62a formed in the channelled shaft 13 and opening out into a cylindrical bore 63 of the latter.

Similarly, a radial conduit 61b formed in the body of the worm screw 1 opens out into each distributing conduit 57b which radial conduit is for its part in communication with the radial conduit 62b made in the channelled shaft 13.

All the radial conduits 62a are located in the same transverse plane and all the radial conduits 62b are located in another transverse plane adjacent the preceding one.

A cylindrical stem 65a is mounted with slight friction in the bore 63 of the channelled shaft 13, which stem may slide without turning in a bore 81 of a boss 83 secured, by means of a screw 28, to the casing 3 and serving to retain the roller bearing 16. The axial length of the cylindrical stem 65a is equal to the distance which separates the two transverse planes containing respectively, the conduits 62a and the conduits 62b. The stem 65a is secured in rotation by the end of a pin 84 mounted radially in the boss 83, said end being engaged in a pin groove 85 of the cylindrical stem 65a.

The cylindrical stem 65a is bored with a blind axial hole 67 which communicates with a radial hole 68 opening out on the surface of the said stem in a type of chamber formed between the bore 63 of the channelled shaft and a flat part 69 situated to the right of the radial channels 62a, or alternatively of the radial channels 62b, depending upon whether said stem occupies one or the other of its two extreme axial positions.

The blind hole 67 is connected to a suitable source of oil under pressure by means of a radial hole 87 (see also FIGURE 4) formed in the cylindrical stem 65a, a conduit 88 formed in the boss 83, a joint 71, a pipe 72, a joint 73 and a conduit 74 formed in the upper part of the casing 3. The arrangement is such that the radial hole 87 of the cylindrical stem 65a is permanently in communication with the conduit 88 of the boss 83, whatever be the axial position of the cylindrical stem.

The dimensions of the flat part 69, formed in the cylindrical stem 65a are such that the hole 68 is in communication with the radial conduits for distributing oil embracing an arc which is substantially equal to the arc of the threads of the toothed racks 2, i.e. in the example an arc of the order of 90°.

Each distributing conduit 53a or 53b, opens outwardly into a depression 76 (see also FIGURE 5) the depth of which decreases towards its edges, at least in a circumferential direction.

The axial displacement of the cylindrical stem 65a is effected by a hydraulic jack, having a piston 91 which is integral with or second to said stem and is mounted in a cylinder 92 integral with or second to the boss 83 and closed by a cover 94 secured by means of screws 95. This is a double action jack and may be selectively supplied through one or the other of the two ends of the cylinder, by means of conduits 96, 97 connected to a reversing electrically-operated valve 98 suitable for putting them selectively in communication with a conduit 101 of fluid under pressure and a conduit 102 for connecting it to a tank 103.

Preferably, the valve 98 is actuated in synchronism with an electrical device for pre-selecting the direction of rotation of the member which must drive the screw 1.

The operation of the arrangement is as follows:

When the members occupy the position shown in the drawing, the oil for lubricating the threads of the worm screw passes through the following path: conduit 74, joint 73, conduit 72, joint 71, conduit 88, radial hole 87, blind hole 67 of the sliding stem 65a, radial hole 68 of said stem, chamber formed by the flat part 69, and beyond that it penetrates successively into the radial conduits 61a which are located, at the moment in question, in the arc of the part of screw thread engaged with the threads of the toothed rack, so that the distributing conduits 57a and the distributing conduit 53a, ensuring the supply of oil under pressure on the right-hand flanks of the threads of the screw. In these conditions, these thread flanks are those which support the reaction of the translation force imposed on the moving member of the machine. Thus, in these conditions, whatever may be the speed of rotation of the screw, these threads will be suitably lubricated under pressure.

It will now be assumed that the direction of rotation of the worm screw 1 is to be reversed to reverse the direction of displacement of the moving machine member. To this end, the system of preselecting this direction of rotation is actuated, and as referred to above, the valve 98 for controlling the jack 92 is actuated at the same time, so that it is the conduit 96 which will receive the oil under pressure, whilst the conduit 97 will be connected to the tank 103. The result is that the piston 91 of the jack will be displaced towards the right (FIGURE 1) whilst driving, with it, the cylindrical stem 65a. The radial hole 68 and the chamber defined by the flat part 69 of this stem will therefore this time be located in the transverse plane which contains the radial conduits 62b for supplying oil under pressure to the left sides of the threads of the worm screw. Similarly, now it is the left hand sides, subjected to the reaction of the translation force, which will be lubricated with oil under a suitable pressure.

It will be noted that the screw thread flanks which are not supplied with oil under pressure by the described distributing device, nevertheless receive oil, under a low pressure by the leakages of said distributor.

I claim:

1. The combination with a screw and nut device of the threaded rack type used for controlling the movements of a machine tool part, a source of oil under pressure, said screw having internal distributing conduits formed therein with the outer ends of said conduits opening out on both flanks of the thread thereof and the inner ends of said conduit being connected to said source of oil, said conduits being divided into a first group of conduits which open onto one of the flanks of said screw thread and a second group of conduits which open onto the other flank of said screw thread, and distributor means connecting the inner ends of said conduits to said source of oil and constructed and arranged to connect to said source at each moment only those conduits which open out on parts of that screw thread flank which are in contact with the associated flank of the teeth of the rack forming part of said device, said distributing means including throw-over switch means having two positions and operable to cause the oil to be selectively supplied to that one of said two groups of conduits which is associated with the thread flanks transmitting the force in accordance with the direction of rotation of said screw.

2. The combination of claim 1, in which said throw-over switch means comprises a movable oil distributor member associated with the inner ends of both groups of conduits and selectively in direct communication with one of said group of conduits on each position of said throw-over switch means.

3. The combination of claim 2, in which said screw has an inner cylindrical surface on which opens a first supply passage communicating with one of said groups of conduits and on which opens a second supply passage communicating with the other of said groups of conduits, such openings of said supply passages being spaced longitudinally of the axis of said screw, and in which said distributor member is movably mounted in said inner cylindrical screw surface and has an input oil supply conduit one end of which is connected to said source of oil and the other end of which is associated with said supply passage openings, and including means for fixing said distributor member against rotation, and means for moving said distributor member axially to selectively place it in a position in which it places the source of oil in communication with one or the other of said two groups of conduits.

4. The combination of claim 2, in which said throw-over switch means comprises a hydraulic jack, the piston of which is formed by an extension of the body of said distributor member.

5. The combination of claim 2, in which each group of conduits is divided into a plurality of subgroups, the other ends of each of said subgroups of conduits being located in a radial plane different from that of the other subgroups and connected to a common distributing conduit therefor extending in a direction parallel to the axis of the screw, and conduits in said screw connecting all of said common distributing conduits to said distributor member.

6. The combination of claim 1, in which said distributing means is associated with one end of said screw with said distributor member thereof extending axially into such one end of the screw, a boss enclosing the portion of said distributor member projecting from said one end of the screw, means fixing said distributor member against rotation relative to said boss but permitting axial movement thereof relative to said boss, a casing for said screw, a bearing located between said casing and said screw at one end of the screw, said boss serving as a cover for said bearing, and means securing said boss to said casing.

7. The combination of claim 1, in which there is provided in the thread flanks of the screw at the outer end of each conduit in the two groups thereof, a depression having a depth which decreases toward its edges in at least that direction which is tangential to the rotational movement of the screw, and having a section capable of facilitating the formation of a film of oil between the engaged thread flanks.

References Cited

UNITED STATES PATENTS

| | | | |
|---|---|---|---|
| 1,132,748 | 3/1915 | Sundh. | |
| 2,320,353 | 6/1943 | Ernst et al. | 184—6 X |
| 2,333,161 | 11/1943 | Dunn | 184—6 |
| 2,606,454 | 8/1952 | Westling | 184—6 X |
| 2,842,226 | 7/1958 | Liebel | 184—6 |
| 3,031,897 | 5/1962 | Seidel. | |
| 3,064,758 | 11/1962 | Ohrnberger | 184—6 |
| 3,068,713 | 12/1962 | Davis | 184—6 X |

FOREIGN PATENTS

| | | |
|---|---|---|
| 561,250 | 5/1944 | Great Britain. |
| 770,502 | 3/1957 | Great Britain. |

LAVERNE D. GEIGER, *Primary Examiner.*

H. S. BELL, *Assistant Examiner.*